United States Patent
Singh et al.

(10) Patent No.: US 10,887,234 B1
(45) Date of Patent: Jan. 5, 2021

(54) PROGRAMMATIC SELECTION OF LOAD BALANCING OUTPUT AMONGST FORWARDING PATHS

(71) Applicant: Amazon Technologies, Inc., Seattle, WA (US)

(72) Inventors: Bijendra Singh, Cedar Park, TX (US); Sravya Kusam, Austin, TX (US); Anand Narayan Acharya, Austin, TX (US); Kari Ann O'Brien, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 193 days.

(21) Appl. No.: 15/051,555

(22) Filed: Feb. 23, 2016

(51) Int. Cl.
*H04L 12/803* (2013.01)
*H04L 12/721* (2013.01)
*H04L 12/24* (2006.01)

(52) U.S. Cl.
CPC .......... *H04L 47/125* (2013.01); *H04L 41/083* (2013.01); *H04L 45/14* (2013.01)

(58) Field of Classification Search
CPC ...... H04L 47/125; H04L 41/083; H04L 45/14
See application file for complete search history.

(56) References Cited

U.S. PATENT DOCUMENTS

| | | | |
|---|---|---|---|
| 6,272,522 B1 | 8/2001 | Lin et al. | |
| 6,580,715 B1 | 6/2003 | Bare | |
| 7,215,637 B1 | 5/2007 | Ferguson et al. | |
| 9,843,482 B1* | 12/2017 | Thirumurthi | H04L 43/0894 |
| 9,906,592 B1* | 2/2018 | Roitshtein | H04L 67/1036 |
| 2010/0214913 A1* | 8/2010 | Kompella | H04L 45/125 370/230 |
| 2011/0158237 A1* | 6/2011 | McDysan | H04L 67/16 370/392 |
| 2012/0170449 A1* | 7/2012 | Nakash | H04L 45/28 370/225 |
| 2012/0281539 A1* | 11/2012 | Patel | H04L 45/026 370/241 |
| 2013/0166775 A1* | 6/2013 | Yang | H04L 67/1008 709/241 |

OTHER PUBLICATIONS

McKeown et al., OpenFlow: Enabling Innovation in Campus Networks, ACM SIGCOMM Computer Communication Review, vol. 38, No. 2, Apr. 2008.*

* cited by examiner

*Primary Examiner* — Alex Skripnikov
*Assistant Examiner* — Sharmin Chowdhury
(74) *Attorney, Agent, or Firm* — Robert C. Kowert; Kowert, Hood, Munyon, Rankin & Goetzel, P.C.

(57) ABSTRACT

A packet processor or packet processing pipeline may implement programmatic selection of load balancing output for forwarding paths. Programmatic selection for load balancing among forwarding paths may be enabled or disabled at one or more stages. If programmatic selection is enabled when network packets are received, a programmatically identified path may be provided as the selected path of a load balancing scheme at a stage. Forwarding of the packet may then be performed according to the selected path.

20 Claims, 7 Drawing Sheets

US 10,887,234 B1

PROGRAMMATIC SELECTION OF LOAD BALANCING OUTPUT AMONGST FORWARDING PATHS

BACKGROUND

Network communications are foundational to the operation of many different systems and devices. Large public networks, such as the Internet, or smaller private networks, such as corporate intranets, facilitate communications between different systems or devices, from clients of services that provide storage, computing, or data delivery to hosting internal web sites or network tools accessible to a small number of users. Such networks utilize large numbers of networking devices to facilitate the fast and reliable delivery of data, network packets, from one system to another.

Leveraging the power of network communications has greatly increased the demand upon networking devices to receive, process, and send network packets. In turn, this increased demand has led to a greater need to increase the capacity and/or reduce the latency of processing network packets in a network. However, increasing networking device performance is not without cost. Powering devices to handle high workloads at great speed, for example, may be subject to various physical limitations, such as heat generated by power intensive networking devices, so that without certain power budgets or others limitations, networking devices may be unable to handle the workloads sustainably. Other limitations, such as chip area, may limit the amount of resources that may be applied to increase network processing capacity. Therefore, techniques that provide efficient utilization of networking device resources without sacrificing performance may be desirable.

Figure 1:
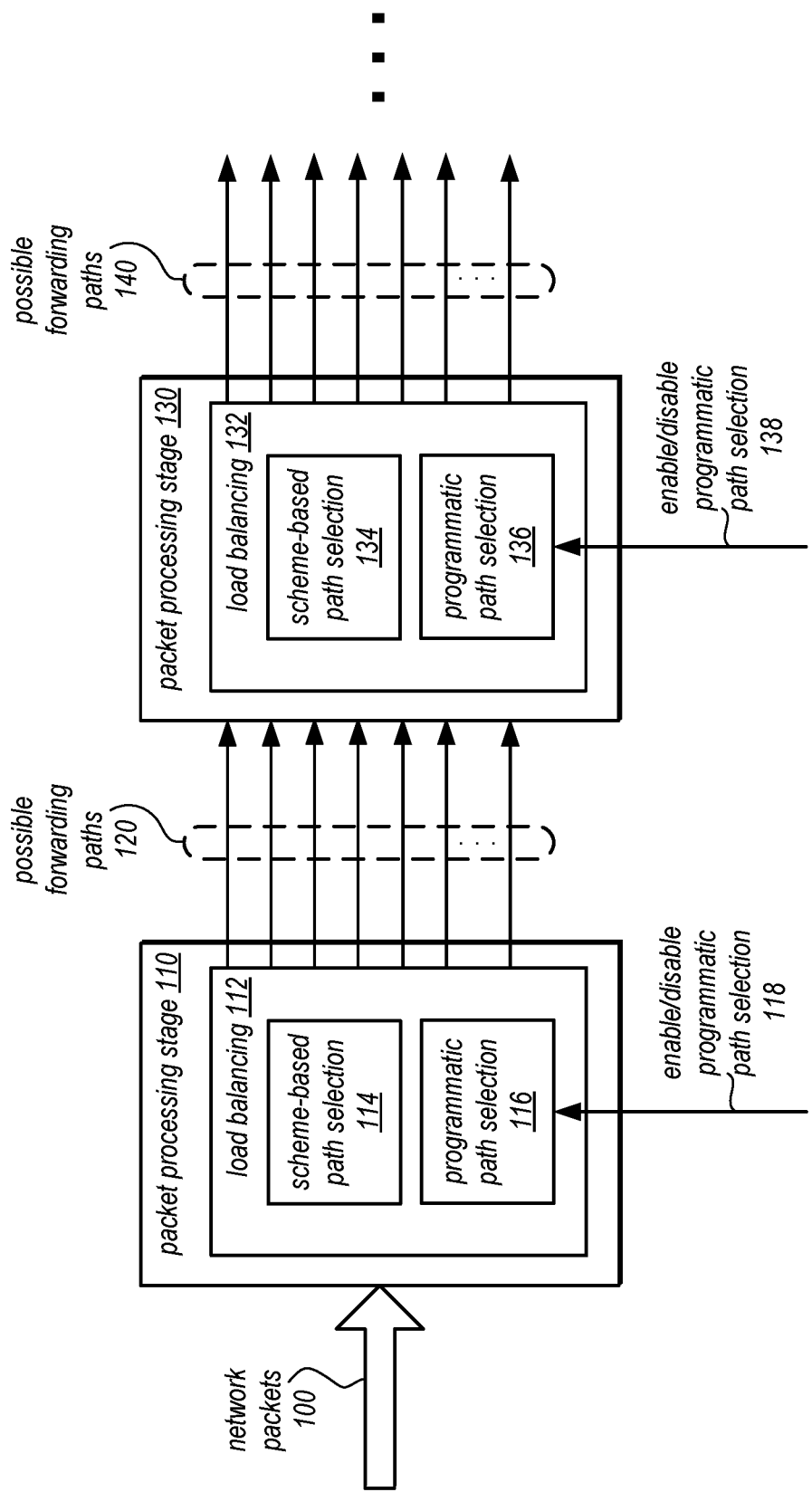
FIG. 1 is a logical block diagram illustrating programmatic selection of load balancing output amongst forwarding paths, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units. . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described herein may implement programmatic selection of load balancing output for processing network packets. Network packets are packets of data (e.g., datagrams) sent across a network from a source networking device (e.g., a network interface card implemented at a computer or server) to a destination address representing an end networking device. The network may include many other networking devices, such as various kinds of switches, routers, network bricks, or any other device capable of receiving, processing, and/or sending the network packets across links between the networking devices in the network.

The path or route which a network packet travels may be determined according to forwarding decisions made at various networking devices in a network. A switch, for instance, may receive a network packet and make forwarding decisions with respect to the content of information in the network packet, such as various packet header fields. For example, a tunnel, multipath route, next hop address, or link aggregation may be determined which may identify the next immediate destination to which the network packet may be sent according to the tunnel, multipath route, next hop address, and/or link aggregation. Once forwarding decisions are made, modifications to the packet may be performed, and the packet sent to a next networking device connected to the current networking device (or the networking packet may be dropped). Forwarding of the network packet may continue amongst the networking devices of a network until the network packet reaches the desired destination.

Different forwarding decisions may result in following different routing paths. For instance, different tunnels applied to a network packet may result in the network packet traveling along different routes. In some embodiments, many different paths may ultimately lead to a same destination. To take advantage of multiple alternative paths, load balancing may be performed among common alternative paths at different stages in a packet processing pipeline in order to provide a more evenly distributed flow of network packets across different paths. Balanced traffic may improve the latency, bandwidth, reliability and various other performance characteristics of network traffic.

Implementing load balancing is not without cost. Because many load balancing techniques randomly distribute network packets along different paths, in scenarios where specific paths need to be validated or monitored in order to diagnose potential networking problems, load balancing can interfere or prevent network packets from being directed along a particular path. For example, in some embodiments, a packet processing pipeline may need to ensure that a packet is able to pass through any number of possible paths without being subjected to different logical parameters or outcomes (e.g., verifying that all paths have a same minimum transmission unit (MTU) so that some packets are not dropped for exceeding the MTU in one path that would not be dropped in another path). Moreover, in some embodiments, multiple instances of load balancing may occur across different paths in a packet processing pipeline, dramatically increasing the possible number of paths a network pack can travel and increasing the difficulty of evaluating one or multiple ones of a large number of possible paths. Implementing programmatic selection of load balancing output for processing network packets may allow for specific forwarding paths in a packet processing pipeline to be tested. In this way, different forwarding paths which are load balanced may be deterministically tested in a way that is transparent to the other processing stages in the packet processing pipeline.

FIG. 1 is a logical block diagram illustrating programmatic selection of load balancing output amongst forwarding paths, according to some embodiments. Different types of network packets 100 (e.g., layer 2 (L2), layer 3 (L3), or multiprotocol label switching (MPLS)) may be received at a packet processor or packet processing pipeline for determining forwarding decisions at one or multiple packet processing stages, such as packet processing stage 110 and 130. Different possible forwarding paths, such as possible forwarding paths 120 and 140, may be selected for network packets 100. Load balancing, such as load balancing 112 and 132, may be implemented to distribute network packets amongst the different possible forwarding paths. Load balancing may select forwarding paths according to a load balancing scheme (e.g., round robin or hashing), such as scheme-based path selection 114 and scheme-based path selection 134, or according to a path identified programmatically, such as by programmatic path selection 116 and 136.

Scheme-based path selection for different processing stages may be implemented in many ways. Scheme-based path selection 114 may utilize a hash value generated for packet processing stage 110 in order to select one of possible forwarding paths 120 according to hash value ranges, as discussed below with regard to FIGS. 4-6, in some embodiments, while scheme-based path selection 134 for packet processing stage 130 may implement a round-robin scheduling technique to balance network packets 100 across possible forwarding paths 140. Thus, different load-balancing schemes may be implemented for different packet processing stages.

Programmatic path selection 116 may be enabled for load balancing to make a selection of a forwarding path according to a programmatically identified path without changing the processing or handling of a network packet once the path selection is provided. In this way, subsequent processing stages or components may be agnostic as to whether programmatic path selection is enabled or disable for the network packet. To enable or disable programmatic path selection, controller or other component that can interface with a packet processor or packet processing pipeline to send a request or command to enable/disable programmatic path selection for a particular packet processing stage. For instance, as illustrated in FIG. 1, request 118 may be sent to indicate to load balancing 112 to change the output of load balancing 112 from scheme-based path selection 114 to programmatic path selection 116 so that a path identified in request 118 (or identified according to information included in request 118) is output as the selected path instead of a path that would have been selected by scheme-based path selection 114. Request 118 may indicate the particular path, in some embodiments, or provide some information for determining or retrieving the identified forwarding path (e.g., lookup table address). Once programmatic path selection 116 is enabled, the identified path may be continually be provided as load balancing 112 output for processing each received network packet 100 until a different path is identified for programmatic path selection or programmatic path selection is disabled.

Different packet processing stages may have programmatic path selection enabled or disabled at different times. For instance, request 118 may enable programmatic path selection for packet processing stage 110 while request 138 may disable programmatic path selection for packet processing stage 130. In addition to having programmatic path selection enabled or disabled for different packet processing stages, the identified path for selection may be different as well. Thus, a first path of possible forwarding paths 120 may be identified for packet processing stage 110 and a second path of possible forwarding paths 140 may be identified for packet processing stage 130. By providing flexible selection of stages and paths for programmatic path selection, various path combinations can be tested. A diagnostic component, program, or tool can automatically program and reprogram different paths in order to quickly configure the packet processor or packet processing pipeline for testing in multiple configurations.

Please note that the previous description of programmatic selection of load balancing output amongst forwarding paths is not intended to be limiting but is provided as a logical example. Different numbers of processing stages, possible forwarding paths, load-balancing schemes, and other components (such as stages that do not perform load balancing) may be implemented. Moreover, the organization of components, entries, and other depicted items may be different than those illustrated in FIG. 1 (e.g., load-balancing values/components may be generated in one stage for use at subsequent packet processing stages.)

This specification begins with a general description of a networking device, which may utilize programmatic selection of load balancing output amongst forwarding paths to evaluate the performance of forwarding network packets at a packet processor along different paths. Then various examples of a packet processor are discussed, including different components/modules, or arrangements of components/modules that may be implemented and lookup forwarding routes in entries that include increasing entropy across routing table segments. A number of different methods and techniques to implement programmatic selection of load balancing output amongst forwarding paths are then discussed, some of which are illustrated in accompanying flowcharts. Various examples are provided throughout the specification.

Figure 2:
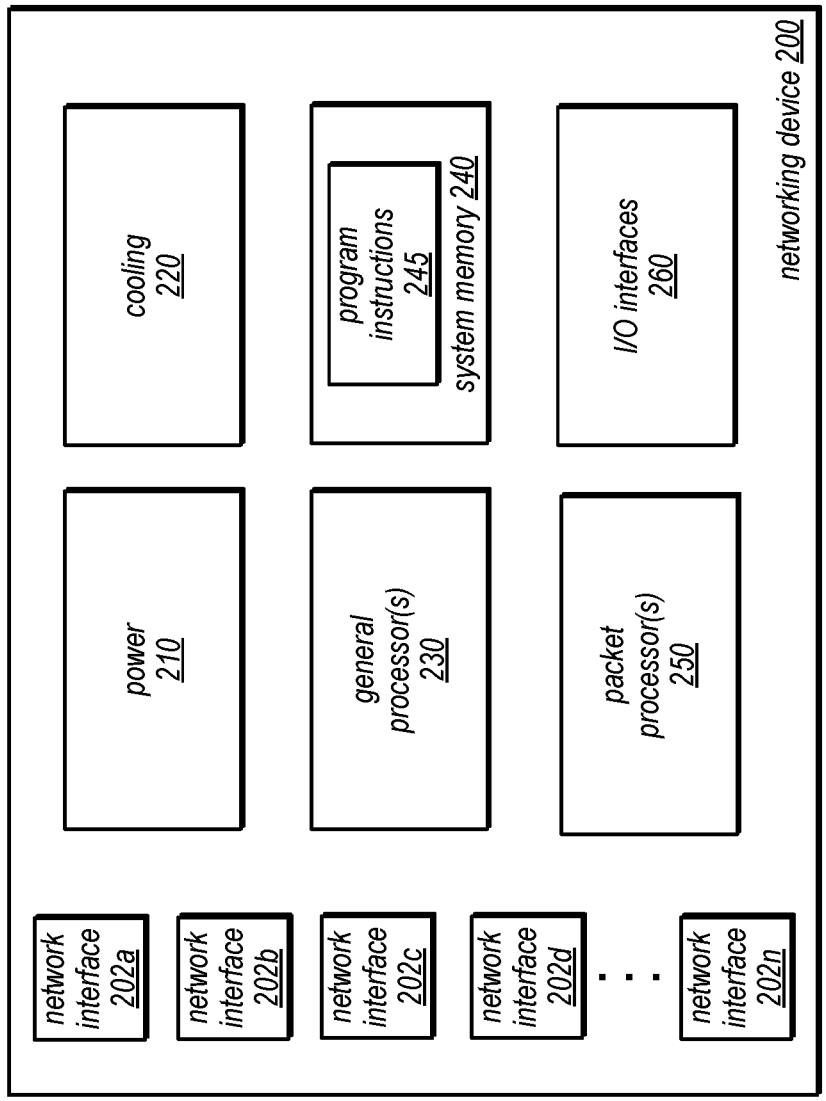
FIG. 2 is a logical block diagram illustrating a networking device that implements a packet processor, according to some embodiments.

FIG. 2 is a logical block diagram illustrating a networking device that implements a packet processor, according to some embodiments. Networking device 200 may be a networking device configured to route, forward, or otherwise facilitate the communication of different devices, systems or networks via network connections to the networking device. A networking device may provide electrical and logical network connections. Networking devices may operate utilizing data included in different OSI layers, such as layers 2 and 3 to make forwarding determinations (e.g., to send a network packet received from one source connected to the switch to another source connected to the switch). Please note that networking devices, such as a switch, in some contexts (e.g., when discussing layer 3 data) may be considered a type of router. Networking devices may also provide other services when facilitating communications, such as implementing network firewalls, network intrusion detection, and/or collecting metrics for performance analysis.

In at least some embodiments, networking device 200 may implement multiple network interfaces 202, which correspond to physical connections of different communication lines (e.g., twisted pair cables, coaxial cables, or fiber optic cables) connected to corresponding network interface ports. Network interfaces 202 may provide for different types, speeds, or other formats of network communication. For example, network interfaces 202 may provide different ports for 10 Gigabit, 40 Gigabit, or 100 Gigabit Ethernet cables. Many ports support multiple speeds, such as both 10 Gigabit and 100 Gigabit Ethernet connections.

Power 210 may be one or more power supplies that provide electricity to the various electrical components that draw upon power to perform operations (e.g., cooling 220, general processor(s) 230, system memory 240, packet processor(s) 250, and/or I/O interfaces 260. Cooling 220 may be one or more fan units implemented to circulate air and draw heat out of networking device 200.

Networking device 200 may include general processor(s) 230 which may include multiple cores (and which may be single or multi-threaded) coupled to a system memory 240 via an input/output (I/O) interface 260. Networking device 200 may be a uniprocessor system including one processor 230, or a multiprocessor system including several processors 230 (e.g., two, four, eight, or another suitable number). General processors 230 may be any suitable processors capable of executing instructions. For example, in various embodiments, processors 230 may be general-purpose or embedded processors implementing any of a variety of instruction set architectures (ISAs), such as the x86, PowerPC, SPARC, or MIPS ISAs, or any other suitable ISA. In multiprocessor systems, each of processors 230 may commonly, but not necessarily, implement the same ISA.

Networking device 200 includes one or more system memories 240 that are configured to store program instructions and data accessible by processor(s) 230. In various embodiments, system memories 240 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 240 may contain program instructions 245 that are executable by processor(s) 230 to implement various management functions and interfaces for networking device 200. In various embodiments, program instructions 245 may be encoded in platform native binary, any interpreted language such as Java™ byte-code, or in any other language such as C/C++, Java™, etc., or in any combination thereof.

In some embodiments, program instructions 245 may include instructions executable to implement an operating system (not shown), which may be any of various operating systems, custom or off the shelf operating systems. Any or all of program instructions 245 may be provided as a computer program product, or software, that may include a non-transitory computer-readable storage medium having stored thereon instructions, which may be used to program a computer system (or other electronic devices) to perform a process according to various embodiments. Program instructions 245 may also implement a controller that is configured to interface with packet processor(s) 250. For example, a controller may be configured to program memory devices with new or additional information (e.g., update next hop tables, action tables, insert or remove forwarding routes, etc.) according to the techniques discussed below with regard to FIGS. 4 and 7 in order to programmatically select load balancing output amongst forwarding paths at different forwarding stages. Additionally, a controller may be able to access network packets trapped or logged by a packet processor 250 for further analysis and direct processing actions to be performed by packet processor 250 for the network packet.

A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system via an I/O interface. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system as system memory or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface.

Networking device 200 may implement one or multiple I/O interface(s) 260 to provide access to networking device 200 (e.g., to perform various switch management operations). In one embodiment, I/O interfaces 260 may be configured to coordinate I/O traffic between processor 230, system memory 245, packet processor(s) 250, and any peripheral devices in the system. In some embodiments, I/O interfaces 260 may perform any necessary protocol, timing or other data transformations to convert data signals from one component (e.g., system memory 245) into a format suitable for use by another component (e.g., processor 230). In some embodiments, I/O interfaces 260 may include support for devices attached through various types of peripheral buses, such as a variant of the Peripheral Component Interconnect (PCI) bus standard or the Universal Serial Bus (USB) standard, for example. In some embodiments, the functions of I/O interfaces 260 may be split into two or more separate components, such as a north bridge and a south bridge, for example. Also, in some embodiments, some or all of the functionality of I/O interfaces 260, such as an interface to system memory 240, may be incorporated directly into processors 230.

Figure 3:
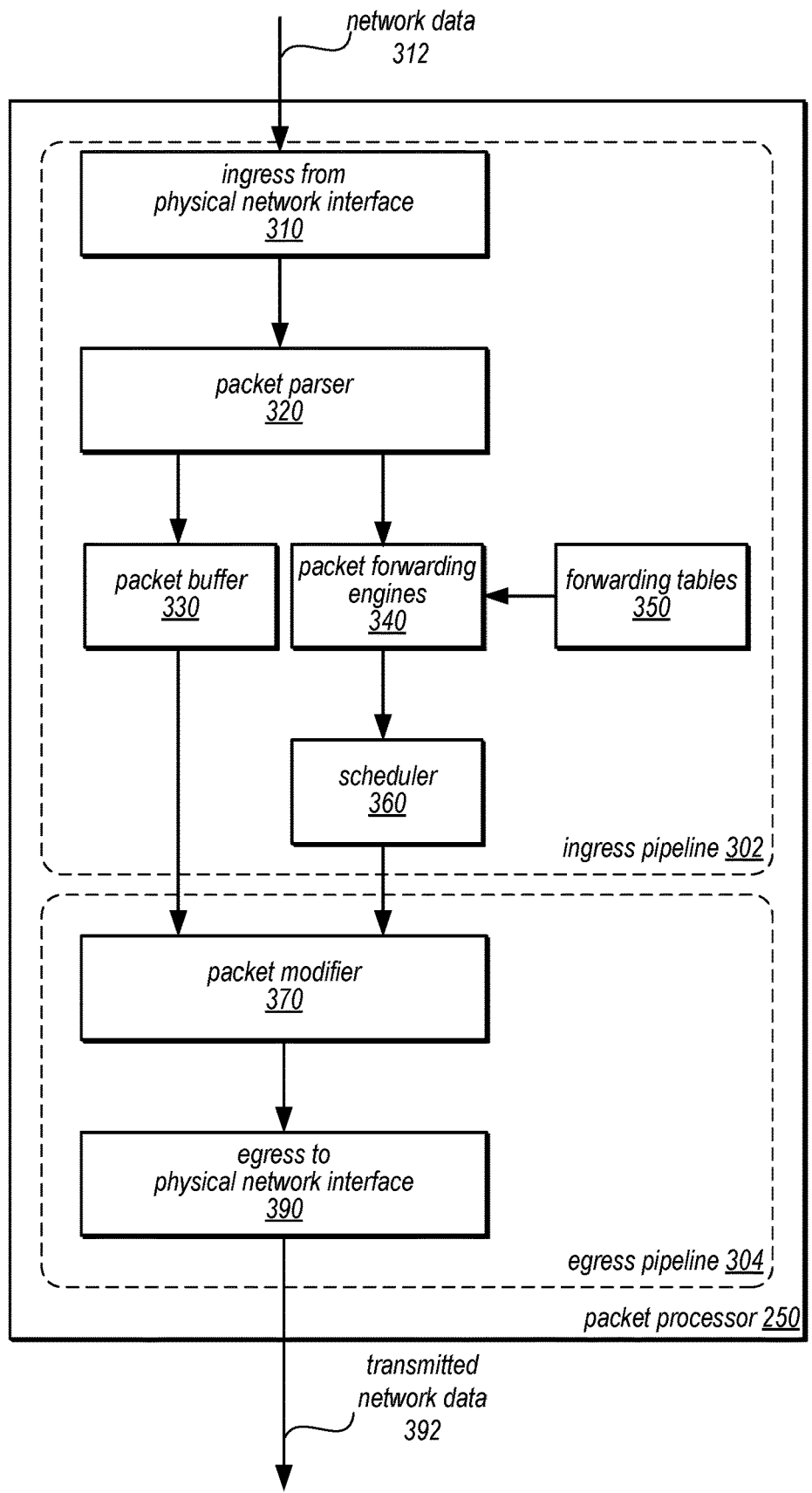
FIG. 3 is a logical block diagram illustrating a packet processor that process network packets utilizing load balancing amongst possible forwarding paths, according to some embodiments.

As noted in FIG. 2, one or more multiple packet processors 250 may be implemented to process data received via network interface(s) 202 at networking device 200. Packet processor(s) 250 may be implemented as dedicated hardware to perform various stages of packet processing for networking device 200. For example, packet processor(s) 250 may be implemented as an application specific integrated circuit (ASIC), field programmable gate array (FPGA), or other dedicated circuitry that performs packet processing, such as a System on a Chip (SoC). Packet processor(s) 250 may also be implemented as a software-based packet processing pipeline to perform various stages of packet processing for networking device 200 (e.g., via program instructions executing on one or more general processors 230). Packet processor(s) 250 may be assigned to one or multiple network interface(s) 202, performing dedicated processing of network data received via the assigned network interface(s) 202. FIG. 3 is a logical block diagram illustrating a packet processor that process network packets utilizing load balancing amongst possible forwarding paths, according to some embodiments. Note that a packet processor may sometimes be referred to as a "network switch" (e.g., when implemented as a switch-on-a-chip). However, the term "network switch" is also commonly used to describe networking hardware, such as a switching hub, that may implement one or multiple packet processors as well as other hardware (such as discussed above with regard to networking device 200 in FIG. 2). Therefore, the term "packet processor" has been used herein to prevent confusion when referring to dedicated hardware for performing packet forwarding.

Packet processor 250 may implement multiple processing pipelines to output a processed network packet. For example, as illustrated in FIG. 3, ingress pipeline 302 and egress pipeline 304 may be implemented to provide forwarding of network packets as part of the data plane so that forwarding may be performed without software-based techniques. Ingress pipeline 302 may include different components, units, or stages, such as an ingress unit from a physical network interface 310, a packet parser 320, a packet buffer 330, packet metadata lookups 340, and scheduler 350. Ingress pipeline 302 may also access packet tables 350 and other packet routing information. Egress pipeline 304 may include a packet modifier 370 with access to other packet modification data, and an egress unit to physical network interface 390.

As data is received from network interfaces, ingress unit 310 may provide a physical layer (PHY) interface and Ethernet Media Access Control (MAC) layer interface. These interfaces may evaluate a stream of network data 312 (e.g., bit stream) received at packet processor 250 to detect valid streams and segment the stream into datagrams (e.g., packets/frames). For instance, the PHY layer may receive and transmit data across physical connections (e.g., such as electrical signals received over twisted pair or coaxial cable or optical signals received over optical fiber) at network interfaces 202. The PHY layer may implement different techniques dependent on the speed or type of network interface configured (e.g., Ethernet 10BASE-T, 100BASE-TX, and 1000BASE-T forms), such as encoding, multiplexing, synchronization, clock recovery and data serialization. Various signaling standards, such as IEEE 802.3, may govern the performance of the PHY layer consistent with the open systems interconnection (OSI) model for communications. The MAC layer may delimit frames and packets from the stream of data. Error checking may also be implemented at the MAC layer, checking for different errors, such as frame check sequence (FCS), inter-frame gap enforcement, and frame preambles.

Packet parser 320 may receive a network packet from ingress 310 and separate the packet header from the packet payload. The payload of the packet may be stored in packet buffer 330. Packet parser 320 may parse the packet header to determine and/or extract data for making a forwarding decision for the packet. For example, packet parser 320 may extract different layer headers (e.g., L2, L3, and L4 headers) included in an Internet Protocol (IP) version 4 packet, such as the source MAC address, the destination MAC address, the source IP address, the destination IP address, and port numbers. The extracted data may then be utilized to perform lookups to make forwarding decisions at packet forwarding engines 340. Packet parser 320 may also be used to generate hash values for performing load balancing amongst different paths at subsequent stages in ingress pipeline 302, as discussed in detail below with regard to FIG. 4, including enabling or disabling programmatic selection of paths as the output of load balancing for different stages.

Packet forwarding engines 340 may access data stored in packet tables 350 to make forwarding and tunneling decisions for the network packet based on information in the packet header (e.g., packet metadata) extracted by packet parser 320. For example, packet forwarding engines 340 may perform lookups for data in layer 2 (L2) portions of the packet to perform L2 forwarding. L2 forwarding may access a MAC address table in packet tables 350 perform two lookups (which may be in parallel). The first lookup may be performed with a key extracted from the packet header at packet parser 320 (e.g., a VLAN and source MAC address), to determine whether an entry for the packet is present in the MAC address table. If the source MAC address is unknown, then a mapping determination may be made to map the source MAC address to a port. If the MAC address is known but attached to a different port than indicated in the MAC address table, then an operation may be performed to move the source MAC address to the port. Otherwise the MAC address is known in the MAC address table. Another lookup to the MAC address table may also be performed with another key (e.g., the VLAN and the destination MAC address). The network packet may be routed if the MAC address table contains an entry for the destination MAC address owned by the networking device 200 (otherwise other operations may be performed, such as trapping the network packet for the CPU, bridging the packet out of a listed interface, or flooded out of all ports in an STP forwarding state).

Figure 5:
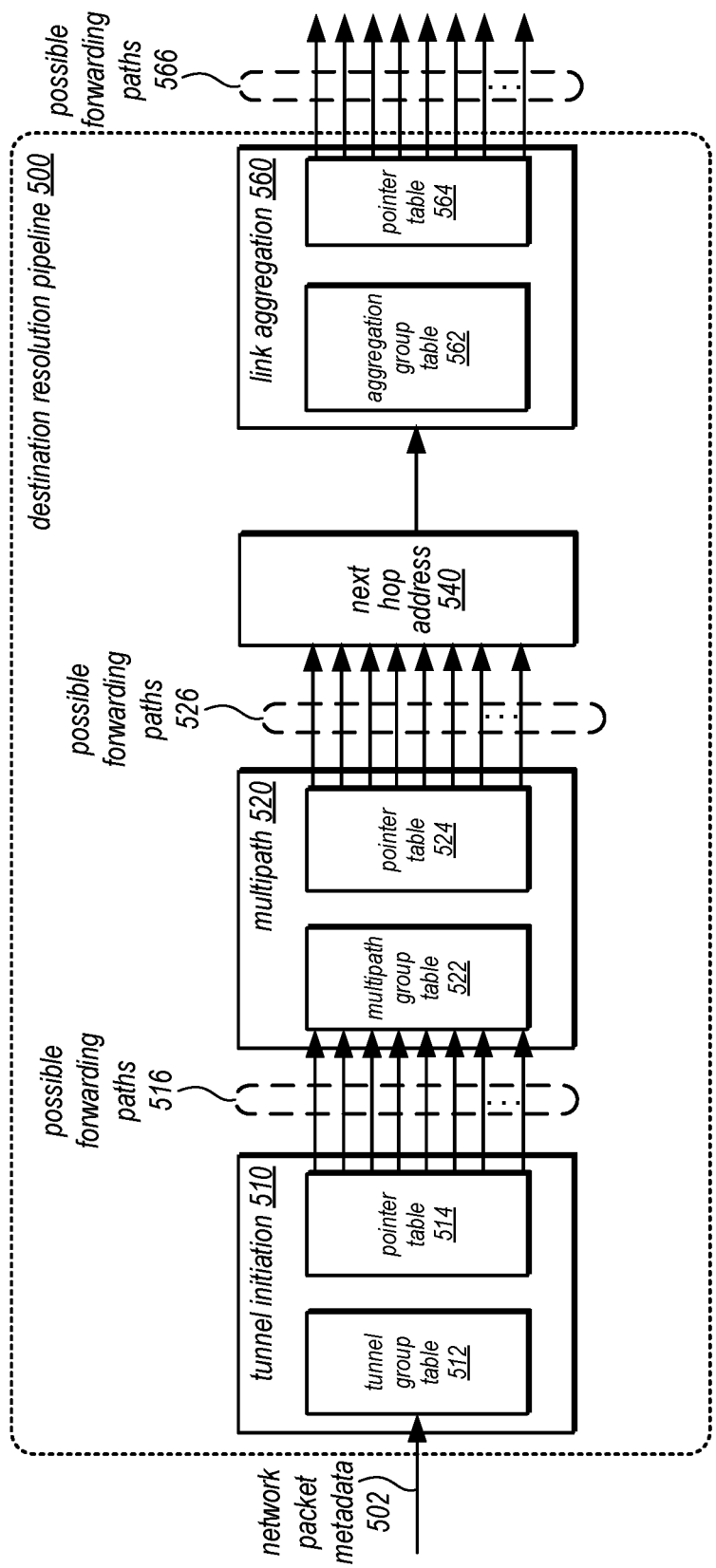
FIG. 5 is a logical block diagram illustrating load balancing utilizing a hash value at different stages of a packet processor, according to some embodiments.
Figure 6:
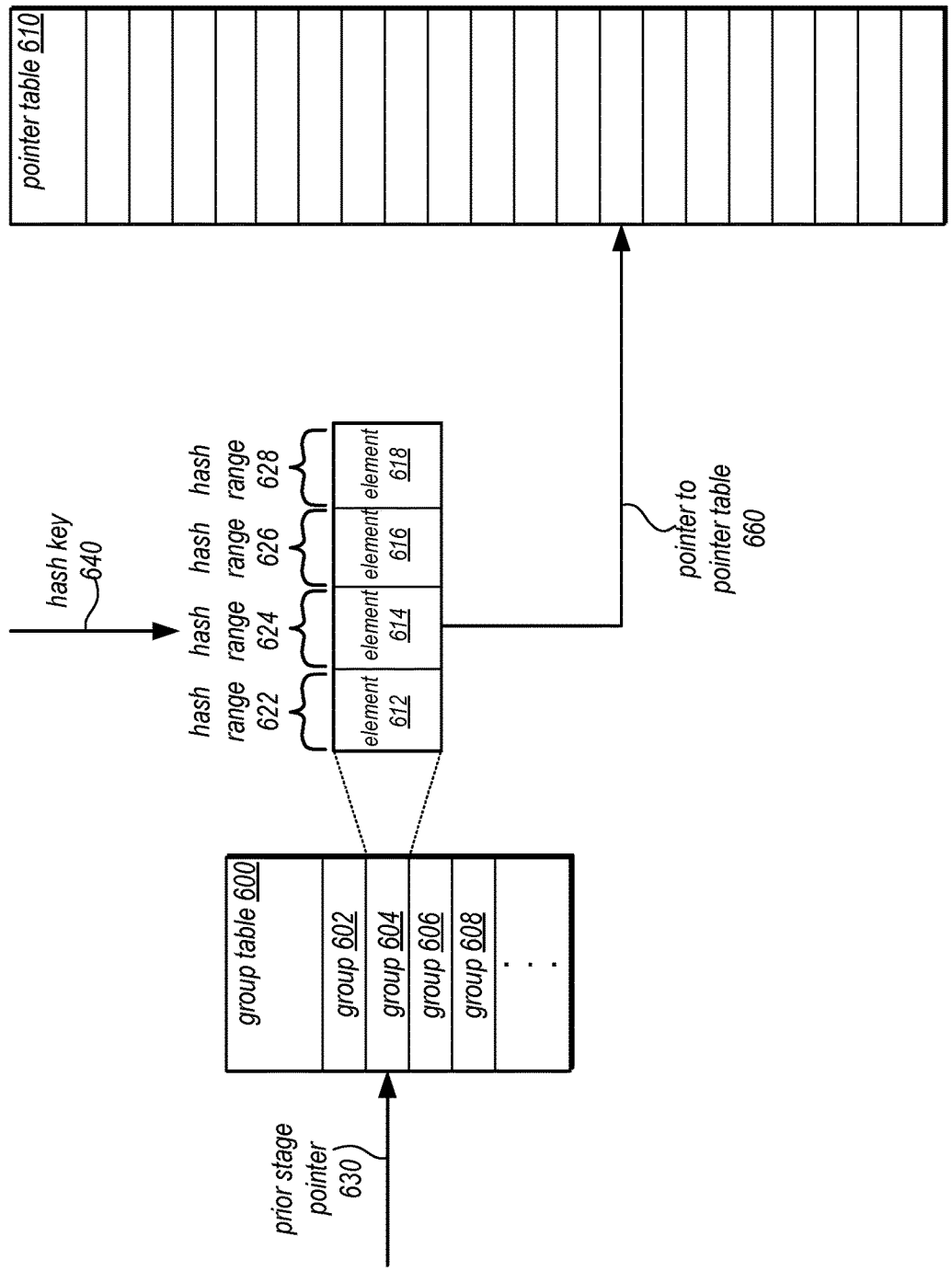
FIG. 6 is a logical block diagram illustrating utilizing a hash value generated according to a load balancing scheme or a programmatically identified value, according to some embodiments.

Similarly, packet forwarding engines 340 may also perform lookups for data in layer 3 (L3) portions of the packet to perform L3 forwarding in some embodiments. For example, internet protocol (IP) headers for the packet may be evaluated with respect to entries in tables, such as a routing or next hop table, to determine forwarding to be performed. Please note that the previous examples of packet forwarding engines 340 is not exhaustive, as many other forwarding decisions may be made, including, but not limited to, forwarding engines for spanning tree protocol (STP) state checking, access port virtual LAN (VLAN) handling, VLAN membership checking, MAC2ME lookup, broadcast/multicast forwarding to a host CPU for the switch (e.g., CPU(s) 230), tunnel start/termination lookup, source MAC lookup, learn filtering, learn requests, moved source MAC checking, multiprotocol label switching (MPLS) label lookups, traffic class mapping, time-to-live (TTL) checks, packet actions based on ingress/egress access control lists (ACL), and/or various other destination resolution lookups. FIGS. 5 and 6 discussed below, provide many examples of different forwarding engines 340, including forwarding engines that utilize hash values to perform load balancing among different possible forwarding paths. As packet forwarding engines 340 make forwarding decisions about the packet (e.g., for L2, L3 and/or tunneling), the decisions are maintained as packet metadata. The packet metadata may be provided to scheduler 360 for scheduling determinations.

As discussed above, packet tables 350 may be implemented in one or multiple storage devices, such as various memory devices (e.g., a CAM, such as a TCAM, and/or random access memory) to store table data for performing different routing decisions. Tables may include a VLAN table, MAC address table, routing table, adjacency table, next hop table, tunnel start table, tunnel termination table, and/or actions table. Each of these different tables may be utilized to retrieve or determine packet forwarding decisions, tunneling decisions, and associated modifications that may need to be made to network packets.

Scheduler 360 may control the buffering of packets and scheduling of operations within packet processor 250. For example, scheduler 360 may implement a memory management unit to allocate available memory segments in packet buffer 330 to store packets to be buffered. If a packet needs to be buffered (e.g., because the egress interface is congested), scheduler 360 may store the packet in a private pool of memory assigned to a particular physical interface port for the packet or shared pools of memory to store packets (e.g., if the private pool of memory is full). Scheduler 360 may also implement a memory management unit to dequeue packets from packet buffer 330 for final processing and egress. Scheduler 360 may provide the appropriate metadata for a packet to modifier 360. Although not illustrated in FIG. 3, packets from packet buffer 330 and packet metadata from scheduler 360 may be moved from ingress pipeline 302 to egress pipeline 304 via a crossbar. A crossbar may, for example, be implemented by one or more destination rings to transmit a network packet from the ingress pipeline 302 via egress pipeline 304 to a desired destination port.

Network packets that have passed through ingress pipeline 302 may be scheduled or released from packet buffer 330 for modification, reassembly and egress as part of egress pipeline 304. Packet modifier 370 may be implemented to modify packet headers based on the routing decisions made at the packet metadata determine by packet forwarding engines 340. For example, if tunneling is enabled for a packet, packet modifier 370 may create and insert the appropriate tunnel header in order to encapsulate at least a portion of the packet to implement a tunneling protocol. Packet modifier 370 may also perform modifications to other data in the packet header. Once the modified packet has been reassembled, egress unit to physical network interface 290 may utilize the physical layer (PHY) interface and the Ethernet Media Access Control (MAC) layer interface to transmit network packets as network data 392 via the appropriate physical connection (e.g., coaxial, twisted pair, or optical cable).

Figure 4:
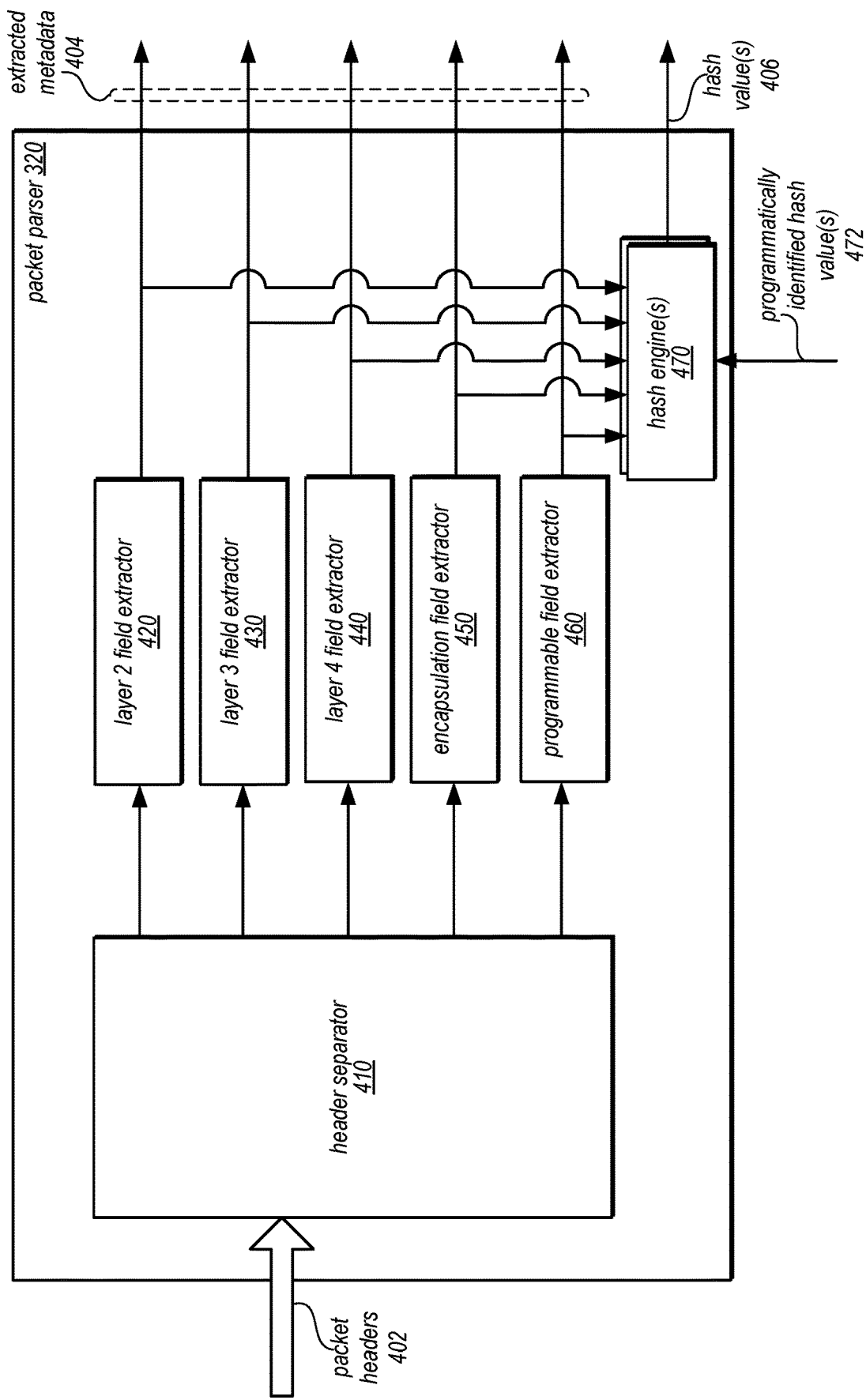
FIG. 4 is a logical block diagram illustrates a packet parser that generates network packet metadata including hash values generated according to a hash function or a programmatically identified value, according to some embodiments.

FIG. 4 is a logical block diagram illustrates a packet parser that generates network packet metadata including hash values generated according to a hash function or a programmatically identified value, according to some embodiments. Packet parser 320 may extract header data from a variety of packet types received at the packet processor. Different types of network packets may include different header types (e.g., Ethernet, layer 2 only, MPLS, IPv4, IPv6, layer 3 only, UDP, TCP, or generic routing encapsulation (GRE)) in various orderings. For instance, a network packet may include an Ethernet header, then an MPLS header, then a GRE header, then an IPv4 and finally a TCP header. Packet parser 320 may be programmed to identify valid or expected sequences of header types and may be re-programmed to support different packet or header types.

Packet parser 320 may process packet data in streaming or pipelined fashion so that as a stream of packet header data 402 is received packet processor 320 and processed by one stage of packet parser (e.g., header separator 410), other stages of packet parser 320 may process other data in the packet header stream. For example, as illustrated in FIG. 4, header separator 410 may receive packet header data 402, identify the header type of the data, and provide an indication of the header type of the data, along with the header data, to field extractors 420, 430, 440, 450, and 460, so that field extractors may extract data from the stream of data where appropriate (e.g., fields from data identified as a layer 2 header at layer 2 field extractor 420). In this way, header separator 410 may continue processing new data for a different network packet, while field extractors work to extract data for metadata fields of the prior network packet. As illustrated in FIG. 4, field extractors may operator in parallel, in some embodiments, to extract data from different headers or layers of a network packet, which are identified to the field extractors by header separator 410. Layer 2 field extractor 420 may extract layer 2 metadata fields, while in parallel, layer 3 field extractor 430 extracts layer 3 metadata fields, for instance.

Header separator 410 separates and/or identifies packet headers 402 into different header types. For instance, as header data 402 is received, header separator 410 may access a separation lookup table to identify the header type that includes header data 402 based on state information maintained for the header separator, (e.g., the current header, the next header pointer, and a next packet type pointer). Header separator 410 may provide indications to field extractors 420, 430, 440, 450, and 460 of the different headers to which header data 402 belongs. For example, header separator 410 may provide labels, tags, or other indicators for each byte of data that identifies which header includes the byte of data. Other information about the data may also be included in the indications provided to field extractors, such as whether the header is an inner or outer header.

Packet parser 320 may implement multiple field extractors to operate in parallel on header data 402 based on indications provided to the field extractors from header separator 410. Different field extractors may generate metadata fields specific to a particular header type or group of header types. For example, as illustrated in FIG. 4, packet parser 320 may implement layer 2 field extractor 420 to extract different portions of data from bytes of packet headers 402 identified as a layer 2 header, such as one or more fields from an Ethernet header. Layer 2 field extractor 420 may access a layer 2 lookup table which may indicate those portions to extract. Note that in some embodiments multiple different header types may be considered layer 2 (or extracted by layer 2 field extractor) and thus the previous example is not intended to be limiting. Lookup table 422 may be programmed to identify those portions to extract, where (e.g., the offset) the portions to extract may be found, and any other operations to perform (e.g., masks to apply) before outputting a metadata field 404 from layer 2 field extractor 420. Similar to layer 2 field extractor, layer 3 field extractor 430, layer 4 field extractor 440, and encapsulation field extractor 450 may be able to identify header data 402 received from header separator 410 as a header from which the field extractor extracts data (e.g., based on the indications received from header separator 410) and extract portions of data. As with layer 2 field extractor 420, layer 3 field extractor 430, layer 4 field extractor 440, and encapsulation field extractor 450 may be able to extract data from multiple types of headers that correspond to the respective layer (e.g., layer 3 may include IPv4, IPv6, internet control message protocol (ICMP), etc.).

Programmable field extractor 460 may be implemented as part of packet parser 320 to generate a programmatically defined field (sometimes known as a "User Defined Field" or "UDF") as part of extracted metadata 404. Programmable field extractor 460 may be configured to extract data from any header identified by header separator 410 (unlike layer 2 field extractor 420, layer 3 field extractor 430, layer 4 field extractor 440, and encapsulation field extractor 450 which may be limited to particular headers) and include different portions of data from different the different headers in a same programmatically defined field. Programmable field lookup table 462 may be programmed to identify different portions of data within a header for extraction.

In at least some embodiments, packet parser 320 may implement hash engine(s) 470 to generate hash values 406 based on extracted metadata 404. Such hash values may be utilized to perform hash-based load balancing across different possible forwarding paths for a network packet at different forwarding stages, such as discussed below with regard to FIGS. 5 and 6. For example, hash engines 406 may apply different hash functions (e.g., CRC16-CITT and CRC16-IBM (Bisync)) to different metadata fields, including a programmatically defined field, to generate one hash value for one processing stage, such as tunneling, and another hash value for a different processing stage, such as link aggregation grouping.

In some embodiments, hash engines 470 may generate hash values based on stored instructions for generating hash values. Store instructions for hash engines 470 may be programmed or specified by a controller accessing control registers, memory, or other components utilized by hash engine(s) 470 to configure the generation of hash values 406. Fields of metadata selected from different headers may be specified (e.g., ingress physical port, ingress logical port, pipeline identifier, port number within the pipeline, source MAC address, destination MAC address, VLAN ID, MPLS labels, source IP address, destination IP address, protocol field, source port, and/or destination port) as may be the programmatically defined field.

In various embodiments, hash engine(s) 470 may be configured to provide hash values generated according to a hash function as discussed above utilizing the stored instructions or to generate a hash value identified to the hash engine(s) 470 for specific forwarding engines. Programmatically identified hash value(s) 472 may be provided to hash engine(s) 470 in order to enable programmatic selection of hash values (and thus a forwarding path) at different forwarding stages. For example, different hash values may be assigned to different hash engine(s) 470 that generate a value for a particular stage at which programmatic selection of path is enabled. Instead of outputting a hash value generated according to a hash function, the hash engine 470 may provide the programmatically identified hash value as output to be used for subsequent load balancing, as discussed below with regard to FIGS. 5 and 6. The same hash value may be provided every time hash values are generated at hash engine(s) 470 for a received network packet so that a flow of network packets are directed along the same path (according to the programmatically selected hash value). Requests to enable or disable the generation of programmatically identified hash value(s) 472 may be made while packet parser is operating and be applied when generating hash values for the next network packet.

FIG. 5 is a logical block diagram illustrating load balancing utilizing a hash value at different stages of a packet processor, according to some embodiments. Destination resolution pipeline 500 may implement multiple different destination resolution stages, such as tunnel initiation stage 510, multipath stage 520, next hop address stage 540, and link aggregation stage 560. When network packet metadata 502 is received, different destination resolution stages may be selected based on accessing an entry in a pointer table at prior stages (either in destination resolution pipeline 500 or a prior stage in packet processing pipeline 302 (e.g., another forwarding engine)), evaluating the pointer type of the pointer to identify a next destination resolution stage corresponding to the pointer type, and performing a lookup operation according to the pointer retrieved from the entry at the prior stage. Some destination resolution stages, such as tunnel initiation stage 510, multipath stage 520, and link aggregation stage 560 may have multiple possible forwarding paths (possible forwarding paths 516, 526 and 566 respectively) via which a network packet may be forwarded based on a previous forwarding decision (e.g., a value in an pointer table entry for a prior stage).

In at least some embodiments, packet processing pipeline 500 may implement tunnel initiation stage 510. Tunnel initiation stage 510 may lookup tunnel initiation data to start or initiate tunneling for a network packet. A prior stage, such as an L2, L3, or ingress access control list forwarding engine may retrieve a pointer that has tunneling pointer type. The tunneling pointer type may indicate that the pointer is a pointer into tunnel group table 512. Some destination resolution stages may utilize a group table and a pointer table in order to manage the distribution of selecting entries in the pointer tables. For example, groups within a group table may include different elements which may together map to an entry in a pointer table. Load balancing utilizing a hash value may be performed with respect to the different elements within a group.

For example, FIG. 6 is a logical block diagram illustrating utilizing a hash value generated according to a load balancing scheme or a programmatically identified value, according to some embodiments. A group table, such as tunnel group table 512 and pointer table 514 may be utilized to perform load balancing. As illustrated in FIG. 6, Group table 600 may be composed of different groups, such as groups 602, 604, 606, 608, and so on. Each group includes different elements. For example, group 604 is illustrated as including elements 612, 614, 616, and 618. Hash ranges may be assigned to the different elements of a group, such as hash range 622 assigned to element 612, hash range 624 assigned to element 614, hash range 626 assigned to element 616, and hash range 628 assigned to element 618. The assignment of hash ranges to different elements for a group may be programmed or reprogrammed by a controller or other component that may access memory maintaining group table 600. For example larger numbers of network packets may be directed to a pointer entry in pointer table 610 by assigning a greater hash value range to a particular member (e.g., element 614) that maps to the particular pointer. In this way, traffic may be distributed across members in a group (and thus pointers in a pointer table) according to an equal cost (e.g., equal hash ranges) or weighted cost distribution scheme (e.g., different size hash ranges), in some embodiments. For example, different amounts of network traffic may be allocated to different tunnels by directing traffic to different elements that point to tunnel pointers which describe different tunnels (e.g., 20% traffic directed to a particular pointer table pointer may be implemented by assigning 20% of the total hash space to element 612, 40% traffic may be directed to a second pointer mapped to element 614 by setting a hash range equivalent to 40% of the hash space, 25% of traffic may be directed to a third pointer mapped to element 616 equivalent to 25% of the hash space, and 15% of traffic directed to a fourth pointer mapped to element 618 which may be 15% of the hash space).

Table groups may be identified by the prior stage pointer 630, which points to one of the groups (e.g., group 604). Group 604 entry points in turn to the group of elements (612, 614, 616, or 618) for the identified group. To select from among the multiple elements, a hash key value 640 is utilized. The hash key value may 640 be a hash value generated by parser 320 or some other packet processing stage prior to tunnel initiation 510 based on different fields accessed in the network packet and/or other metadata in the network packet. The hash key value 640 may fall within a range assigned to one of the elements (e.g., hash range 624 assigned to element 614). A pointer to pointer table 660 may be determined by element 614 and group 604 in order to read the identified pointer. Programmatically identified hash values 640, included in metadata for a stage with programmatic selection of load balancing output enabled, may therefore be the same (e.g., always a value of "1") for each network packet while programmatic selection is enabled and thus fall within the same hash range and element (e.g., always fall within hash range 624 and element 614). In this way, the same pointer 660 to pointer table 610 is identified, leading to the same path identified by the entry in pointer table 610. However, when programmatic selection is not enabled, then hash values 640 may change from one network packet to the next, balancing the utilization of different elements, and thus different pointers and possible paths.

Turning back to FIG. 5, once the appropriate entry for pointer table 514 in tunnel initiation 510, the contents of the entry may be read and evaluated. An entry in pointer table 514 may include (but is not limited to), an indication as to whether the tunnel entry is valid, tunnel initiation data (e.g., a tunnel header index, which points to a location in another memory or storage device to retrieve a copy of a tunnel header which is used to encapsulate the network packet in order to apply tunneling, and a tunnel header size, which indicates the size of the tunnel header, or any other description of tunnel header data to encapsulate the packet, which may be applied at packet modifier 370), a pointer to another destination resolution stage, and/or a pointer type for the pointer. For example, the entry may include a pointer identified as a next hop address pointer so that the next destination resolution stage to process the network packet is next hop address stage 540.

Destination resolution pipeline 500 may implement a multipath destination resolution stage 520, in some embodiments. Multipath destination resolution stage 520 may provide weighted cost multipath (WCMP) to distribute network traffic amongst multiple valid paths in a network. Paths may be selected based on a hash of the network traffic flow. Moreover, allocations of network traffic can be weighted per network traffic flow. Note that weighting may not be based on bandwidth, in some embodiments. Similar to tunnel initiation stage 510, multipath stage 520 may implement multipath group table 522 and pointer table 524. In this way, the group entries (as discussed above with regard to FIG. 6) may be programmed to direct network traffic to valid paths according to the weighting of the network traffic flows assigned to each group entry in pointer table 524 for a group in multipath group table 522. Group entries in pointer table 524 may include information to direct network traffic according to the corresponding valid path, a pointer, and type of pointer, in some embodiments. The type of pointer may indicate which one of the subsequent destination resolution stages such as multipath 520, link aggregation 560 (or other destination resolution stages not illustrated) may process the network packet.

Although not illustrated in FIG. 5, destination resolution pipeline 500 may implement a multiprotocol label switching (MPLS) outer label stage, in some embodiments. As noted above, different types of network packets (e.g., L2, L3, or MPLS) may be processed at destination resolution pipeline 500. The MPLS outer label stage may provide new MPLS labels as needed for some network packets being tunneled in MPLS or MPLS packets.

Destination resolution pipeline 500 may implement next hop address stage 540, in some embodiments. Next hop address stage 540 may provide entries describing a next hop address (which may be a directly connected host to the networking device or an indirectly connected subnet) for different network packets corresponding to various forwarding routes (e.g., as may be pointed to by an L3 or MPLS forwarding engine or by an access control list rule) or other destination resolution stage (e.g., tunnel initiation stage 510, multipath stage 520, and/or the MPLS outer label stage 530. If a pointer does not point to a valid entry in next hop address stage 540, then the network packet may be trapped, forwarded, or logged for the controller to process. Entries in next hop address stage 540 may include an indication as to whether the entry is valid, an entry for address resolution protocol (ARP), a destination MAC address index, an indication as to whether an egress virtual local area network (VLAN) is valid, an egress VLAN, an egress logical port indication, an indication of the maximum transmission unit (MTU), and an indication as to whether the network packet should be mirrored. In some embodiments, entries may also include tunnel information (which may supersede tunnel information in tunnel initiation stage 510), such as an indication as to whether tunneling is enabled for the network packet, an index or location of a tunnel header to insert to enable tunneling, and a tunnel header size.

Although not illustrated in FIG. 5, destination resolution pipeline 500 may implement a fast re-route stage, in some embodiments, after next hop address stage 540 The fast re-route stage may provide a quick substitution of a back-up link when a link goes down. For MPLS packets, if fast re-route is enabled for the logical port selected in the next hop address stage 540. The packet may be encapsulated with a fast re-route label (e.g., by packet modifier 370) and provided with an alternate egress port and DMAC address. Fast re-route label insertion may be enabled and disabled per port (logical or physical) with control registers that indicate whether the port has fast re-route enabled or disabled (i.e. whether the port is down or up). A controller may set the fast re-route label, alternate egress and DMAC address in the fast re-route in advance as back up routes and then enable them with a single change to the control register for the particular port that has gone down, so that MPLS packets that were meant to egress on that particular port will use the backup route.

Destination resolution pipeline 500 may implement link aggregation stage 560, in some embodiments. Link aggregation stage 560 may enable sharing of bandwidth across multiple ports. To enable this feature, link aggregation stage 560 is implemented much like tunnel initiation stage 510 and multipath stage 520, utilizing aggregation group table 562 to select group entries in pointer table 564. A particular group entry in 564 may be determined according to a hash value generated for link aggregation stage 560, which may be different than the hash key values generated for tunnel initiation stage 510 and multipath stage 520. In some embodiments, link aggregation stage 560 provides an even distribution of traffic across group entries for a group in pointer table 564. However, weighted distribution is possible and may be programmed by the controller.

As noted above different types of network packets may be processed in a destination resolution pipeline that selectively determines destination resolution stages to determine a forwarding decision for the network packet. When forwarding a network packet according to an Internet Protocol address, according to some embodiments, only some of the illustrated or discussed stages in FIG. 5 may be utilized. For instance, many different pipeline configurations may be utilized for IP type of network packet. IP on IP tunneling may be applied, with or without directing the network packet along one of many valid paths using weighted or equal distribution multipathing, and link aggregation may be provided (if the next hop address is a logical interface). In another example, an MPLS tunnel could be enabled for the network packet so in addition to the illustrated stages in FIG. 5, an MPLS outer label switching stage and/or fast re-route stage could be utilized (e.g., to push one or two MPLS labels in order initiate one or two MPLS tunnel encapsulations for the network packet). Thus, the illustrated examples are not intended to be limiting as to the various configurations of a destination resolution pipeline for an IP packet. Similarly, various different configurations of destination resolution stages may be utilized for MPLS or L2 packet types.

Implementing programmatic selection of load balancing out performed at different ones of the above noted configurations of destination resolution pipeline 500 allows for possible forwarding paths for a variety of packet types and scenarios to be specified. Moreover, as some stages may have programmatic selection enabled (e.g., tunnel initiation 510) while others do not (e.g., link aggregation 566). All of the possible forwarding paths may eventually be tested in destination resolution pipeline 500.

The examples of programmatic selection of load balancing output amongst forwarding paths as discussed above with regard to FIGS. 2-6 have been given in regard to a packet processor implemented as part of a networking device. Note that various other types or configurations of networking devices that implement packet processors or devices with packet processing pipelines may implement these techniques. Moreover, different configurations of the various modules, components, or stages within a packet processor may access, rely upon, or implement the same or different types of load balancing across possible forwarding paths. In addition to examples given above, the techniques discussed below with regard to FIG. 7 may be also implemented using the various components discussed above as well as different types of systems or devices that perform packet processing.

Figure 7:
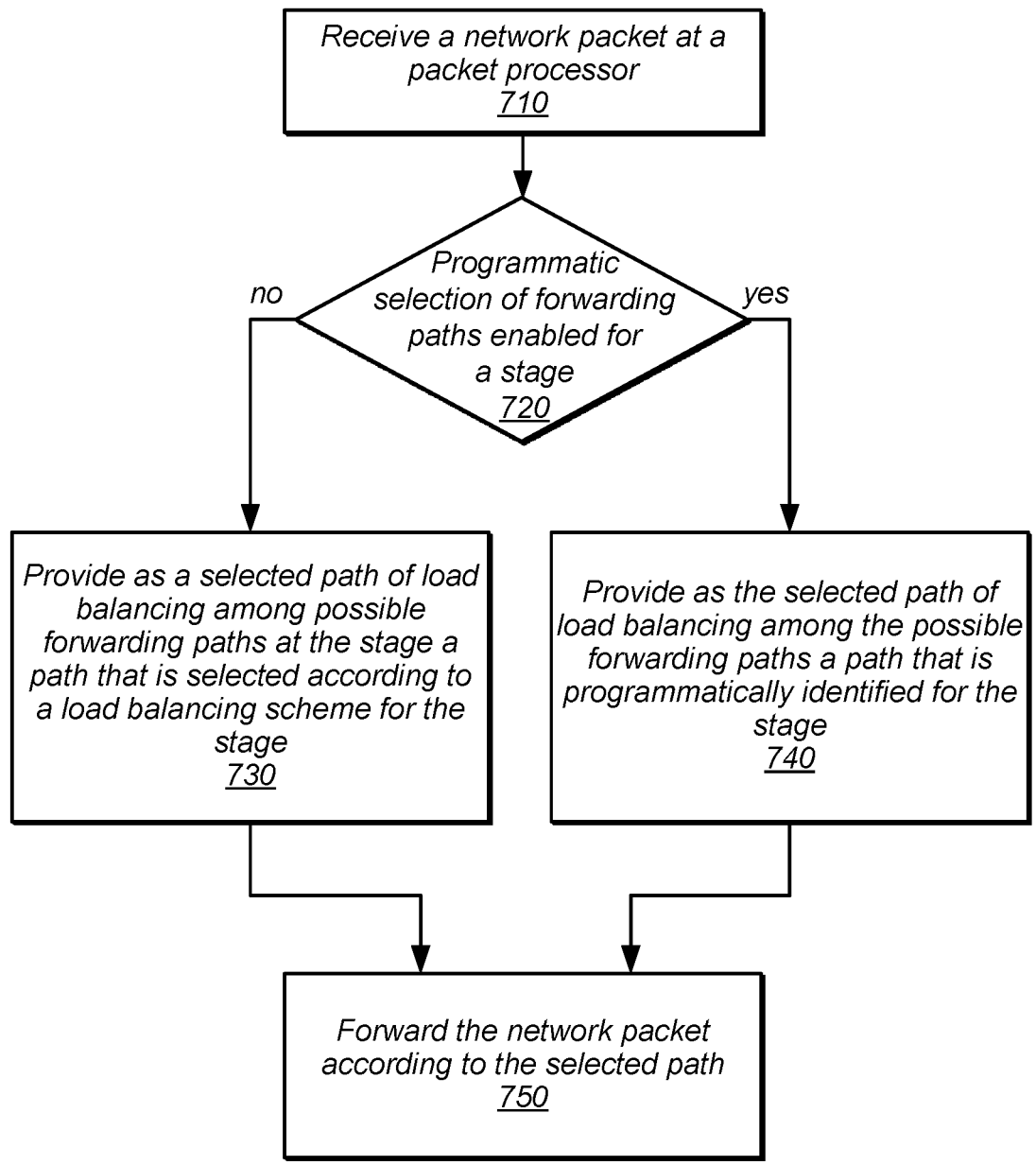
FIG. 7 is a high-level flowchart illustrating various methods and techniques to implement programmatic selection of load balancing output amongst forwarding paths, according to some embodiments.

FIG. 7 is a high-level flowchart illustrating various methods and techniques to implement programmatic selection of load balancing output amongst forwarding paths, according to some embodiments. As indicated at 710, a network packet may be received at a packet processor. Network packets may be a discrete portion of the stream of data transmitted over various types of network connections, such as twisted pair connections, coaxial connections, or fiber optic connections, or other wired or wireless connections formatted according to various transmission protocols. In at least some embodiments, network packets may be a unit of data according to layer 3, the network layer, of the open systems interconnection (OSI) model for communications. Layer 3 protocols may include protocols such as IP, internet control message protocol (ICMP), IP security (IPsec), routing information protocol (RIP), and many others. Note that different packet modifications, however, may be inserted to encapsulate data at differing levels of the OSI model, such as layer 2, layer 2.5, layer 3, and layer 4. In some embodiments, other types of packets such as L2 packets or MPLS packets may be received.

Various packet processing stages may be performed in order to forward the received network packet, such as described with respect to the different stages in packet processor 250 in FIG. 3 and destination resolution pipeline 500 in FIG. 5. For instance, an ingress pipeline may include a packet parser to separate the payload of the network packet from packet header/metadata. Different forwarding engines, such as an L2, L3, and/or MPLS forwarding engine may evaluate information about the network packet (e.g., MAC address, destination address, or labels to determine a forwarding route for the packet, or whether to forward the packet to the controller for further processing or drop the packet. At one or more stages multiple possible forwarding paths may be available for network packets. Load balancing, such as the hash-based load balancing scheme discussed above with regard to FIGS. 4-6, or other load balancing schemes, such as round-robin or other random or deterministic scheduling techniques, may be implemented to select one of the possible forwarding paths for processing the network packet at the stage. As indicated at 720, a determination may be made as to whether programmatic selection of forwarding paths is enabled for a stage.

If not, as indicated at 730, then a path of load balancing for the stage that is selected according to the load balancing scheme for the stage (e.g., by the hash value, state information indicating the "next" path, or any other data or calculation performed to implement load balancing) may be provided. If programmatic selection of forwarding paths is enabled for the stage, as indicated at 740, then the selected path of the load balancing provided is a path that is programmatically identified for the stage. A programmatically identified path may be provided to a packet processor by a controller, or other component, via an interface, control/status register, or other form of programmatic instruction that indicates the path to output for load balancing (or the information used to generate or discover the selected path, such as a hash value which may then be used to identify a path linked to the hash value). Programmatically identifying a path for the stage may depend upon the load balancing scheme of the stage. For instance, if the load balancing scheme is hash-based, then the path may be identified by a given hash value, whereas if the load balancing scheme is round-robin, a pointer identifying the path as the next path may be fixed on the same path.

As indicated at 750, the network packet may be forwarded according to the selected path, in various embodiments. For instance, if the selected path identifies a particular tunnel or link for the network packet, then the network packet is forwarded according to the particular tunnel or link.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A networking device, comprising:
   a physical network interface;
   a controller; and
   a packet processor, separate from the controller, configured to:
   receive a request from the controller, separate from the packet processor, to change output of load balancing performed among a plurality of possible forwarding paths, wherein the load balancing is currently configured to select from among the plurality of possible forwarding paths according to a load balancing scheme, wherein the request indicates the load balancing configuration is to be changed to output a programmatically identified path of the plurality of possible forwarding paths, wherein the programmatically identified path is indicated in the request;
   in response to the receipt of the request, configure the load balancing to provide the programmatically identified path as the output of the load balancing instead of selecting from among the plurality of possible forwarding paths according to the load balancing scheme;
   subsequent to the configuration of the load balancing, receive a network packet via the physical network interface;
   provide the programmatically identified path as the output of the load balancing for forwarding the network packet; and
   forward the network packet according to the provided programmatically identified path output from the load balancing,
   wherein, subsequent to the configuration of the load balancing, the packet processor provides the programmatically identified path as the output of the load balancing for each network packet received via the physical network interface, including the network packet, until the load balancing is configured differently in response to another request from the controller.

2. The networking device of claim 1, wherein the packet processor is further configured to:
   receive an indication for a different path of the possible paths from the controller;
   configure the load balancing to provide the different path as the output of the load balancing for forwarding each subsequently received network packet, wherein the packet processor provides the different path as the output of the load balancing for forwarding each subsequently received network packet until the load balancing is configured differently.

3. The networking device of claim 1, wherein the load balancing scheme performed among the plurality of possible paths is a hash-based load balancing scheme, wherein the programmatically identified path is identified according to a hash value received from the controller.

4. The networking device of claim 1, wherein the packet processor is further configured to:
   in response to a request from the controller to change the output of the load balancing from the programmatically identified path to a path selected according to the load balancing scheme, configure the load balancing to provide one of the possible forwarding paths according to the load balancing scheme as the output of the load balancing for forwarding a subsequently received network packet.

5. A method, comprising:
receiving a network packet at a packet processor;
providing, as a selected path of load balancing at the packet processor, a programmatically identified path of a plurality of possible forwarding paths instead of selecting from among the plurality of possible forwarding paths according to a load balancing scheme, wherein the programmatically identified path is provided as the selected path of the load balancing for each network packet received at the packet processor, including the network packet, until the packet processor is configured by a controller or other component that can interface with the packet processor to not provide the programmatically identified path as the selected path of the load balancing for each network packet received at the packet processor, wherein information regarding the programmatically identified path is obtained from the controller or other component that can interface with the packet processor, and wherein the packet processor selects from among the plurality of possible forwarding paths according to the load balancing scheme when the packet processor is configured to not provide the programmatically identified path as the selected path of the load balancing; and
forwarding, by the packet processor, the network packet according to the selected programmatically identified path.

6. The method of claim 5, wherein the programmatically identified path is provided for a packet processing stage at the packet processor, and wherein the method further comprises:
receiving, at the packet processor, a request from the controller for the packet processor to enable programmatic selection of forwarding paths for the packet processing stage at the packet processor; and
in response to receiving the request to enable the programmatic selection, enabling, by the packet processor, the programmatic selection prior to receiving the network packet.

7. The method of claim 6, further comprising:
receiving, at the packet processor, a request from the controller for the packet processor to disable the programmatic selection of forwarding paths for the packet processing stage at the packet processor; and
in response to receiving the request to disable the programmatic selection, disabling, by the packet processor, the programmatic selection such that for a subsequently received network packet at the packet processor, the path provided as the selected path of the load balancing at the packet processing stage is a path that is selected according to a load balancing scheme for the packet processing stage.

8. The method of claim 6, further comprising:
for another packet processing stage at the packet processor:
receiving a request from the controller for the packet processor to enable programmatic selection of forwarding paths for the other packet processing stage at the packet processor; and
in response to receiving the request to enable the programmatic selection at the other packet processing stage, enabling the programmatic selection at the other packet processing stage such that for a subsequently received network packet at the packet processor, the path provided as the output of the load balancing for the other packet processing stage is a programmatically identified path for the other packet processing stage.

9. The method of claim 8, wherein the request from the controller for the packet processor to enable the programmatic selection of forwarding paths for the other packet processing stage is received subsequent to the receipt of the network packet, wherein a path provided as the output of the load balancing for the other packet processing stage for the network packet is selected according to a load balancing scheme for the other packet processing stage.

10. The method of claim 5, wherein the network packet is one of a plurality of network packet types, comprising:
a layer 2 (L2) packet type;
a layer 3 (L3) packet type; or
a multiprotocol label switching (MPLS) packet type.

11. The method of claim 5, further comprising:
receiving an indication for a different path of the possible paths as the programmatically identified path;
for a subsequently received network packet:
providing, as the selected path of load balancing at the packet processor, the different path; and
forwarding, by the packet processor, the subsequently received network packet according to the different path.

12. The method of claim 5 wherein the load balancing performed among the plurality of possible paths is a hash-based load balancing scheme, wherein the programmatically identified path is identified according to a hash value.

13. The method of claim 5, wherein the packet processor is a general purpose processor executing program instructions that cause the general purpose processor to perform the receiving, the providing, and the forwarding as part of a forwarding engine.

14. A system, comprising:
a device configured to perform packet processing, the device comprising;
a network interface configured to transmit and receive packets via a network connection to the device;
a packet processing pipeline, configured to:
receive a network packet via the network interface;
determine that programmatic path selection is enabled for a stage in the packet processing pipeline that performs load balancing, wherein the stage in the packet processing pipeline that performs load balancing is configured to select from among a plurality of possible forwarding paths according to a load balancing scheme when the programmatic path selection is disabled;
select a path of the plurality of possible forwarding paths that is programmatically identified for the stage instead of selecting from among the plurality of possible forwarding paths according to the load balancing scheme, wherein information regarding the programmatically identified path is obtained from a controller or a component that can interface with the packet processing pipeline; and
forward the network packet at the stage according to the selected path;
wherein, for each network packet received subsequent to the enabling of the programmatic path selection for the stage in the packet processing pipeline that performs load balancing, including the network packet, the packet processing pipeline selects the path of the plurality of possible forwarding paths that is programmatically identified for the stage, until the programmatic path selection is disabled by the controller or the component that can interface with the packet processing pipeline for the stage in the packet processing pipeline that performs load balancing.

15. The system of claim 14, wherein the packet processing pipeline is further configured to:

prior to the receipt of the network packet, receive a request to enable the programmatic path selection for the stage according to a forwarding path indicated in the request; and enable the programmatic path selection for the stage according to the forwarding path.

16. The system of claim 14, wherein the packet processing pipeline is further configured to:

receive a request to enable programmatic path selection for a different stage in the packet processing pipeline according to a forwarding path indicated in the request; and enable the programmatic path selection for the different stage according to the forwarding path such that for a subsequent network packet received at the packet processing pipeline the indicated forwarding path is selected at the different stage for forwarding the subsequent network packet.

17. The system of claim 14, wherein the packet processing pipeline is further configured to:

receive a request to disable the programmatic path selection for the stage; and in response to the receipt of the request, disable the programmatic path selection for the stage such that for a subsequent network packet received at the packet processing pipeline the selected path at the stage is selected according to the load balancing scheme for the stage.

18. The system of claim 14, wherein the stage is:

a tunnel initiation stage;

a multipath stage; or a link aggregation stage.

19. The system of claim 14, wherein the packet processing pipeline is further configured to:

receive an indication for a different path of the possible paths as the programmatically identified path for the stage such that for a subsequently received network packet, the selected path is the different path.

20. The system of claim 14, wherein the device is an application specific integrated circuit (ASIC), a system-on-chip (SoC), or a field-programmable gate array (FPGA).

* * * * *